United States Patent
Okabe et al.

(10) Patent No.: US 9,868,442 B2
(45) Date of Patent: Jan. 16, 2018

(54) VEHICLE CONTROL DEVICE

(71) Applicant: HONDA MOTOR CO., LTD., Tokyo (JP)

(72) Inventors: Atsushi Okabe, Wako (JP); Ukyo Ogata, Wako (JP); Keiichi Nishiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/027,109

(22) PCT Filed: Aug. 28, 2014

(86) PCT No.: PCT/JP2014/072556
§ 371 (c)(1),
(2) Date: Apr. 4, 2016

(87) PCT Pub. No.: WO2015/049938
PCT Pub. Date: Apr. 9, 2015

(65) Prior Publication Data
US 2016/0229406 A1  Aug. 11, 2016

(30) Foreign Application Priority Data

Oct. 4, 2013  (JP) .................................. 2013-209405

(51) Int. Cl.
*B60W 30/18*      (2012.01)
*B60W 30/188*     (2012.01)
(Continued)

(52) U.S. Cl.
CPC ...... *B60W 30/18054* (2013.01); *B60W 10/02* (2013.01); *B60W 10/06* (2013.01);
(Continued)

(58) Field of Classification Search
CPC .. B60W 30/18054; B60W 10/06; F02D 41/08
See application file for complete search history.

(56) References Cited

U.S. PATENT DOCUMENTS 6,556,910 B2 *  4/2003  Suzuki ................... B60K 6/485
                                                        477/8
8,574,123 B2 * 11/2013  Nedorezov ........... B60W 10/06
                                                        477/92
(Continued)

FOREIGN PATENT DOCUMENTS

CN       102628508 A        8/2012
JP       2002-295286       10/2002
(Continued)

OTHER PUBLICATIONS

International Search Report dated Nov. 18, 2014, issued in counterpart International Application No. PCT/JP2014/072556 (2 pages).
(Continued)

*Primary Examiner* — Jacob S Scott
*Assistant Examiner* — Tinh Dang
(74) *Attorney, Agent, or Firm* — Westerman, Hattori, Daniels & Adrian, LLP

(57) ABSTRACT

A control device for a vehicle including an engine, a transmission, a connector/disconnector, and control means, wherein the transmission is configured to change a speed of rotation by drive force of the engine and output the rotation. The connector/disconnector is configured to connect/disconnect transmission of the drive force from the engine to the transmission. The control means controls the engine, the transmission, and the connector/disconnector. In the vehicle control device, in a case where the control means performs idle neutral control by controlling the connector/disconnector to a released state after making the engine return from an idle stop state, the control means makes a determination as
(Continued)

to performance of the idle neutral control when it is determined that a rotational speed of the engine is stabilized.

4 Claims, 5 Drawing Sheets

(51) Int. Cl.

| | |
|---|---|
| *B60W 10/06* | (2006.01) |
| *F02D 41/08* | (2006.01) |
| *F02N 11/08* | (2006.01) |
| *B60W 10/02* | (2006.01) |
| *B60W 50/06* | (2006.01) |
| *F16H 59/74* | (2006.01) |
| *F16H 61/02* | (2006.01) |
| *F16H 63/50* | (2006.01) |
| *B60W 10/107* | (2012.01) |
| *B60W 10/10* | (2012.01) |
| *F02D 41/02* | (2006.01) |

(52) U.S. Cl.
CPC .......... *B60W 10/10* (2013.01); *B60W 10/107* (2013.01); *B60W 30/1884* (2013.01); *B60W 50/06* (2013.01); *F02D 41/08* (2013.01); *F16H 59/74* (2013.01); *F16H 61/02* (2013.01); *F16H 63/50* (2013.01); *B60W 2510/0638* (2013.01); *B60W 2510/101* (2013.01); *F02D 41/022* (2013.01); *F02D 2200/1012* (2013.01); *F02N 11/0818* (2013.01)

(56) References Cited

U.S. PATENT DOCUMENTS

| | | | |
|---|---|---|---|
| 8,814,741 B2* | 8/2014 | Kikura | B60W 10/02 |
| | | | 475/210 |
| 9,086,000 B2* | 7/2015 | Satou | B01D 53/944 |
| 9,382,859 B2* | 7/2016 | Funakoshi | F02D 41/0225 |
| 9,464,715 B2* | 10/2016 | Kawamoto | F02D 17/00 |
| 9,610,935 B2* | 4/2017 | Reed | B60W 10/02 |
| 9,617,937 B2* | 4/2017 | Baroni | F02D 41/08 |
| 9,669,823 B2* | 6/2017 | Shibata | B60W 20/40 |
| 9,670,865 B2* | 6/2017 | Amemiya | B60K 6/48 |
| 2012/0202648 A1 | 8/2012 | Kikura et al. | |
| 2012/0316740 A1 | 12/2012 | Funakoshi et al. | |
| 2016/0137261 A1* | 5/2016 | Ohashi | B62M 25/04 |
| | | | 701/67 |
| 2017/0225674 A1* | 8/2017 | Doering | B60W 20/16 |

FOREIGN PATENT DOCUMENTS

| | | |
|---|---|---|
| JP | 2007-202245 | 8/2007 |
| JP | 2008-75468 | 4/2008 |
| JP | 2010-281398 A | 12/2010 |
| JP | 2012-255492 A | 12/2012 |
| JP | 2013-189952 A | 9/2013 |

OTHER PUBLICATIONS

Office Action and Search Report dated May 18, 2017, issued in counterpart Chinese Application No. 201480054494.X, with English translation. (13 pages).

* cited by examiner

VEHICLE CONTROL DEVICE

TECHNICAL FIELD

The present invention relates to vehicle control devices and, in particular, to a vehicle control device capable of both of what is called idle stop control and idle neutral control of the engine.

BACKGROUND ART

Recently, in view of reducing exhaust gas from vehicles in addition to improvement of fuel efficiency of vehicles, there have been put to practical use vehicles that perform what is called idle stop (IS) control for automatically stopping the engine at the time of idling to wait for the traffic light, for example. Similarly, in view of improvement of fuel efficiency of vehicles, there have been put to practical use vehicles that perform what is called idle neutral (IN) control for putting the input clutch (connector/disconnector) of the transmission into a semi-engagement state at the time of a halt of the vehicle in a forward travel range of the transmission. Moreover, as described in patent document 1, for example, there have been put to practical use vehicles that perform both the idle neutral control and the idle stop control.

In a conventional technique disclosed in patent document 1, while performing the idle neutral control, a vehicle may have line pressure of the oil pressure circuit higher than proof pressure of the electric oil pump. In a situation where the vehicle performs the idle stop and the idle neutral at the same time, overload of the electric oil pump may occur to unfortunately induce malfunction. In view of this, when idle neutral shift conditions are satisfied, the shift to the idle neutral is delayed for a predetermined period of time. When idle stop conditions are not satisfied during this delay time, control is performed to shift to the idle neutral.

RELATED ART DOCUMENTS

Patent Documents

Patent document 1: Japanese Unexamined Patent Application Publication No. 2010-281398.

DISCLOSURE OF THE INVENTION

Problems to be Solved by the Invention

In the conventional technique disclosed in patent document 1, in a case where the idle neutral control can be performed when returning from the idle stop state, the idle neutral control is immediately performed without going through the idle state. In this method, however, immediate performance of the idle neutral control after returning from the idle stop state may unfortunately cause sudden increase of the engine rotational speed (engine pick-up) and hunting (deviation of the rotational speed) that may follow. After that, there is also a possibility that abrupt engagement of the clutch may cause an engine stall. Consequently, when the idle neutral control is performed after returning from the idle stop state, it is necessary to solve the problems described above.

The present invention has been made in view of the above-described problems, and it is therefore an object of the present invention to provide a vehicle control device that performs both the idle stop control and the idle neutral control. When the idle neutral control is performed after returning from the idle stop state, the vehicle control device effectively prevents sudden increase in the engine rotational speed, hunting, and occurrence of an engine stall.

Means of Solving the Problems

In order to solve the above-described problems, the present invention provides a control device for a vehicle including an engine (10), a transmission (26), a connector/disconnector (28a), and control means (66, 90). The engine (10) serves as a drive source of the vehicle. The transmission (26) is configured to change a speed of rotation by drive force of the engine (10) and output the rotation. The connector/disconnector (28a) is configured to connect/disconnect transmission of the drive force from the engine (10) to the transmission (26). The control means (66, 90) controls the engine (10), the transmission (26), and the connector/disconnector (28a), and includes idle stop performance determination means, idle stop return determination means, and idle neutral performance determination means. The idle stop performance determination means makes a determination as to whether to automatically stop the engine (10) in accordance with a predetermined idle stop condition. The idle stop return determination means makes a determination as to whether to restart the engine (10) in accordance with a predetermined return condition from an idle stop state in which the engine (10) is automatically stopped by the idle stop performance determination means. The idle neutral performance determination means makes a determination as to whether to perform idle neutral control by controlling the connector/disconnector (28a) to a released state in accordance with a predetermined idle neutral condition. In a case where the idle neutral control is performed after the engine (10) is returned from the idle stop state based on the determination by the idle stop return determination means, the idle neutral performance determination means makes a determination as to performance of the idle neutral control when it is determined that a rotational speed of the engine (10) is stabilized.

With the vehicle control device according to the present invention, in the control in which idle stop control and idle neutral control coexist, the idle neutral control is performed when the idle stop control cannot be performed so as to sufficiently improve fuel efficiency (fuel consumption rate) of the vehicle. In this case, when returning from the idle stop state, the idle neutral control is not performed immediately after the return but the idle neutral control is performed when it is determined that the engine rotational speed is stabilized. That is, when the idle neutral control can be performed after returning from the idle stop state, the engine shifts from the idle stop state to the idle state once, and in this state, a determination is made as to whether the engine rotational speed is stabilized. When it is determined that the engine rotational speed is stabilized, the idle neutral control is performed. Thus, when the idle neutral control is performed after returning from the idle stop state, it is possible to effectively prevent sudden increase of the engine rotational speed (engine pick-up) and hunting (irregularity of the rotational speed), and occurrence of an engine stall caused by abrupt connection to the forward clutch that follows.

In the above-described control device for the vehicle, the idle neutral performance determination means may include engine rotational speed change determination means and delay time measurement means. The engine rotational speed change determination means makes a determination as to whether a change in the rotational speed of the engine (10)

per unit time is less than a predetermined value. The delay time measurement means measures predetermined delay time (DT2). After the engine rotational speed change determination means determines that the change in the rotational speed of the engine (10) per unit time is less than the predetermined value, and when the predetermined delay time (DT2) measured by the delay time measurement means elapses, the idle neutral performance determination means determines that the rotational speed of the engine (10) is stabilized and makes a determination as to performance of the idle neutral control.

With this configuration, when the idle neutral control is performed after returning from the idle stop state, elapse of the predetermined delay time measured by the delay time measurement means is regarded as a condition in addition to determination as to stabilization of the engine rotational speed by the engine rotational speed change determination means. Consequently, after the rotational speed of the engine is fully stabilized, it is possible to perform the idle neutral control. Therefore, when shifting to the idle neutral control, it is possible to more effectively prevent sudden increase of the engine rotational speed (engine pick-up), hunting, and occurrence of an engine stall.

It is noted that numerals and symbols in parentheses described above denote components in the embodiment, described later, as an example of the present invention.

Effects of the Invention

The vehicle control device according to the present invention prevents sudden increase in the engine rotational speed, hunting, and occurrence of an engine stall when performing the idle neutral after returning from the idle stop.

MODES FOR CARRYING OUT THE INVENTION

Figure 1:
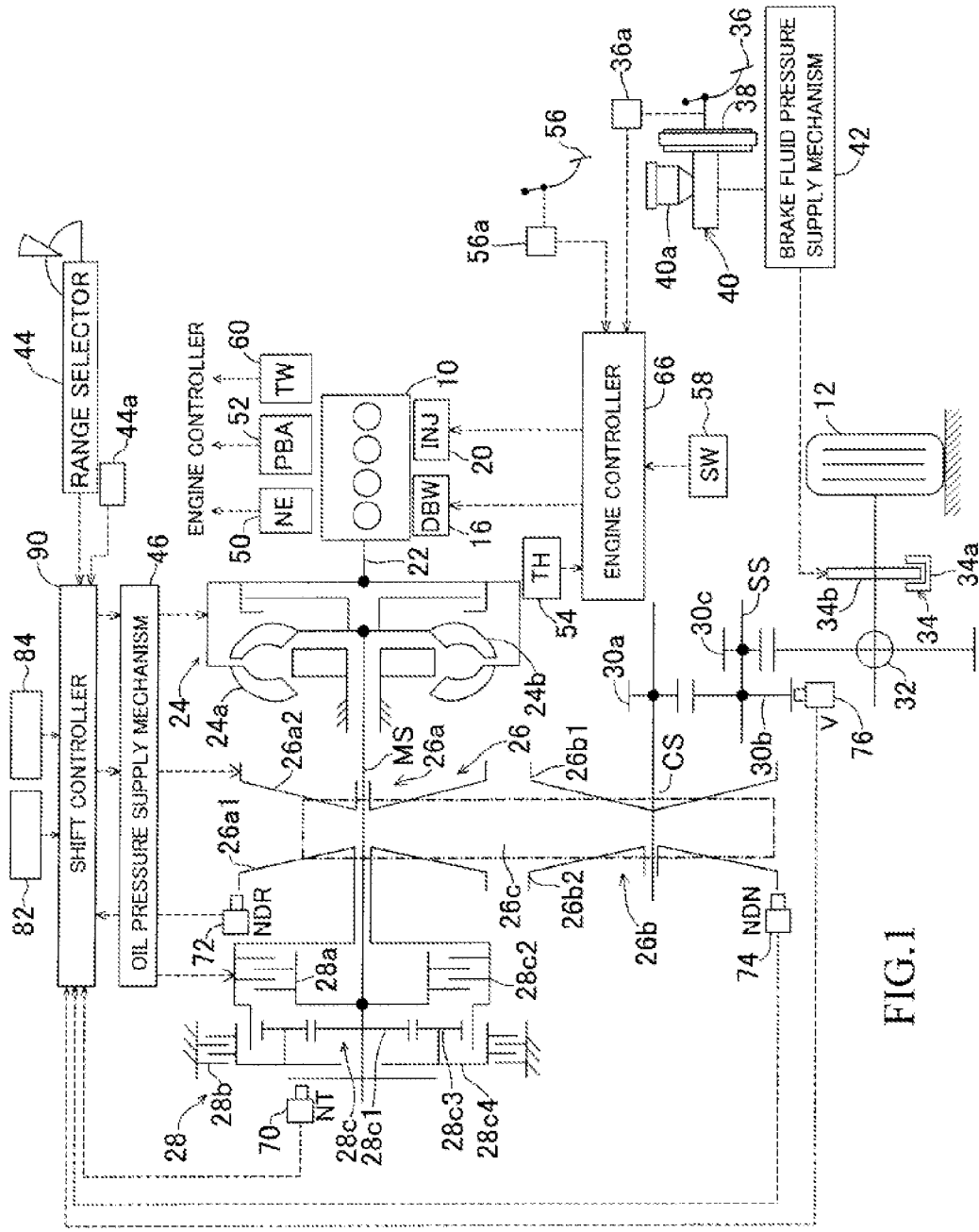
FIG. 1 is a diagram illustrating an exemplary general arrangement of a vehicle control device according to one embodiment of the present invention.

The embodiment of the present invention will be described in detail below with reference to the accompanying drawings. FIG. 1 is a diagram illustrating an exemplary general arrangement of it vehicle control device according to one embodiment of the present invention. A vehicle illustrated in FIG. 1 includes an engine (internal combustion engine) 10, a torque convertor 24, an automatic transmission (transmission) 26, and a forward-reverse switcher 28. The engine 10 selves as a drive source. The automatic transmission 26 changes the speed of rotation by drive force of the engine 10 and outputs the rotation. The forward-reverse switcher 28 includes a forward clutch 28a to connect and disconnect transmission of the drive force of the engine 10 to the automatic transmission 26. Also, the vehicle includes an engine controller 66 and a shift controller 90 serving as a control device to control the engine 10, the automatic transmission 26, and the forward-reverse switcher 28 described above.

A throttle valve (not illustrated) disposed in the intake system of the engine 10 is connected to a DBW (Drive By Wire) mechanism 16, which is mechanically disconnected from the accelerator pedal disposed on the floor of the driver's seat in the vehicle and includes an actuator such as an electric motor. The throttle valve is opened and closed by the DBW mechanism 16.

The intake air, which is regulated in quantity by the throttle valve, passes through an intake manifold (not illustrated). In the vicinity of the intake port of each cylinder, the intake air is mixed with fuel injected from an injector 20 and forms air-fuel mixture. When an intake valve (not illustrated) is opened, the air-fuel mixture flows into a combustion chamber (not illustrated) of the cylinder. In the combustion chamber, the air-fuel mixture is ignited and combusted to drive the piston to rotate a crank shaft 22 and then, as exhaust gas, discharged to the outside of the engine 10.

The crank shaft 22 of the engine 10 is connected to a pump impellor 24a of the torque convertor 24. Meanwhile, a turbine runner 24b, which is opposed to the pump impellor 24a so as to receive fluid (operation oil), is connected to a main shaft (input shaft) MS. Thus, rotation of the crank shaft 22 is input into the automatic transmission 26 through the torque convertor 24. The automatic transmission 26 is made up of a stepless speed changer (Continuous Variable Transmission, hereinafter referred to as "CVT") 26.

The CVT 26 includes a drive pulley 26a, a driven pulley 26b, and a belt 26c. The drive pulley 26a is disposed on the main shaft MS, more precisely, its outer shaft. The driven pulley 26b is disposed on a counter shaft (output shaft) CS, more precisely, its outer shaft. The counter shaft CS is in parallel to the main shaft MS. The belt 26c is an endless elastic member made of, for example, metal wound around the drive pulley 26a and the driven pulley 26b.

The drive pulley 26a includes a fixed pulley half 26a1 and a movable pulley half 26a2. The fixed pulley half 26a1 is disposed on the outer shaft of the main shaft MS and not capable of rotating relative to the outer shaft of the main shaft MS and moving in the axial direction. The movable pulley half 26a2 is disposed on the outer shaft of the main shaft MS and not capable of rotating relative to the outer shaft of the main shaft MS and is capable of moving in the axial direction relative to the fixed pulley half 26a1. The driven pulley 26b includes a fixed pulley half 26b1 and a movable pulley half 26b2. The fixed pulley half 26b1 is disposed on the outer shaft of the counter shaft CS and not capable of rotating relative to the outer shaft of the counter shaft CS and moving in the axial direction. The movable pulley half 26b2 is not capable of rotating relative to the counter shaft CS and is capable of moving in the axial direction relative to the fixed pulley half 26b1.

The CVT 26 is connected to the engine 10 through the forward-reverse switcher 28. The forward-reverse switcher 28 includes a forward clutch (connector/disconnector) 28a, a reverse brake clutch 28b, and a planetary gear mechanism 28c. The forward clutch 28a enables the vehicle to travel in the forward direction. The reverse brake clutch 28b enables the vehicle to travel in the reverse direction. The planetary gear mechanism 28c is disposed between the forward clutch 28a and the reverse brake clutch 28b. The CVT 26 is connected to the engine 10 through the forward clutch 28a.

In the planetary gear mechanism 28c, a sun gear 28c1 is secured on the main shaft MS, and a ring gear 28c2 is secured on the fixed pulley half 26a1 of the drive pulley 26a through the forward clutch 28a. A pinion 28c3 is disposed between the sun gear 28c1 and the ring gear 28c2. The pinion 28c3 is connected to the sun gear 28c1 by a carrier 28c4. When the reverse brake clutch 28b is driven to operate, the carder 28c4 is fixed (locked) by the reverse brake clutch 28b.

Rotation of the counter shaft CS is transmitted to as secondary shaft (intermediate shaft) SS and then to drive wheels 12 through gears. Specifically, rotation of the counter shaft CS is transmitted to the secondary shaft SS through gears 30a and 30b, and the rotation is transmitted through a gear 30c to a differential 32 and then to the left and right drive wheels (only the right one of which is illustrated) 12.

In the vicinity of the drive wheel (front wheel) 12 and a driven wheel (rear wheel), not illustrated, a disk brake (damping device) 34 is disposed. The disk brake 34 includes components such as a caliper 34a and a disk 34b. A brake pedal 36 is disposed on the floor of the driver's seat in the vehicle. The brake pedal 36 is connected to the disk brake 34 through a master vac 38, a master cylinder 40, and a brake fluid pressure supply mechanism 42. The master cylinder 40 includes a reservoir 40a and a piston (not illustrated). The reservoir 40a stores brake fluid. The piston is slidable in an oil chamber filled with the brake fluid stored in the reservoir 40a.

When the driver presses down the brake pedal 36, the pressing force is increased by the master vac 38 and transmitted to the master cylinder 40. The piston of the master cylinder 40 moves for a stroke equivalent to the increased pressing force. Fluid pressure (pressure of the brake fluid) generated by the stroke of the piston is transmitted to the brake fluid pressure supply mechanism 42.

The driver operates a range selector 44 disposed at the driver's seat in the vehicle and selects one of ranges P, R, N, and D so as to switch between the forward clutch 28a and the reverse brake clutch 28b of the forward-reverse switcher 28. Range selection by the driver's operation of the range selector 44 is notified to a manual valve of an oil pressure supply mechanism 46 (described later).

When ranges D, S, and L, for example, are selected through the range selector 44, the spool of the manual valve is moved in accordance with the selection to discharge the operation oil (oil pressure) from a piston chamber of the reverse brake clutch 28b. Meanwhile, oil pressure is supplied to a piston chamber of the forward clutch 28a so as to engage the forward clutch 28a.

When the forward clutch 28a is engaged, all the gears rotate integrally with the main shaft MS, and the drive pulley 26a is driven in the same direction (forward direction) as the main shaft MS. Thus, the vehicle travels in the forward direction.

When range R is selected, the operation oil is discharged flour the piston chamber of the forward clutch 28a, and meanwhile, the oil pressure is supplied to the piston chamber of the reverse brake clutch 28b so as to operate the reverse brake clutch 28b. Consequently, the carrier 28c4 is fixed to drive the ring gear 28c2 in a direction reverse to the direction of the sun gear 28c1, and the drive pulley 26a is driven in a direction (reverse direction) reverse to the direction of the main shaft MS. Thus, the vehicle travels in the reverse direction.

When range P or N is selected, the operation oil is discharged from the piston chambers of the forward clutch 28a and the reverse brake clutch 28b so as to release both of the forward clutch 28a and the reverse brake clutch 28b.

This interrupts motive power transmission through the forward-reverse switcher 28 and interrupts motive power transmission between the engine 10 and the drive pulley 26a of the CVT 26.

Figure 2:
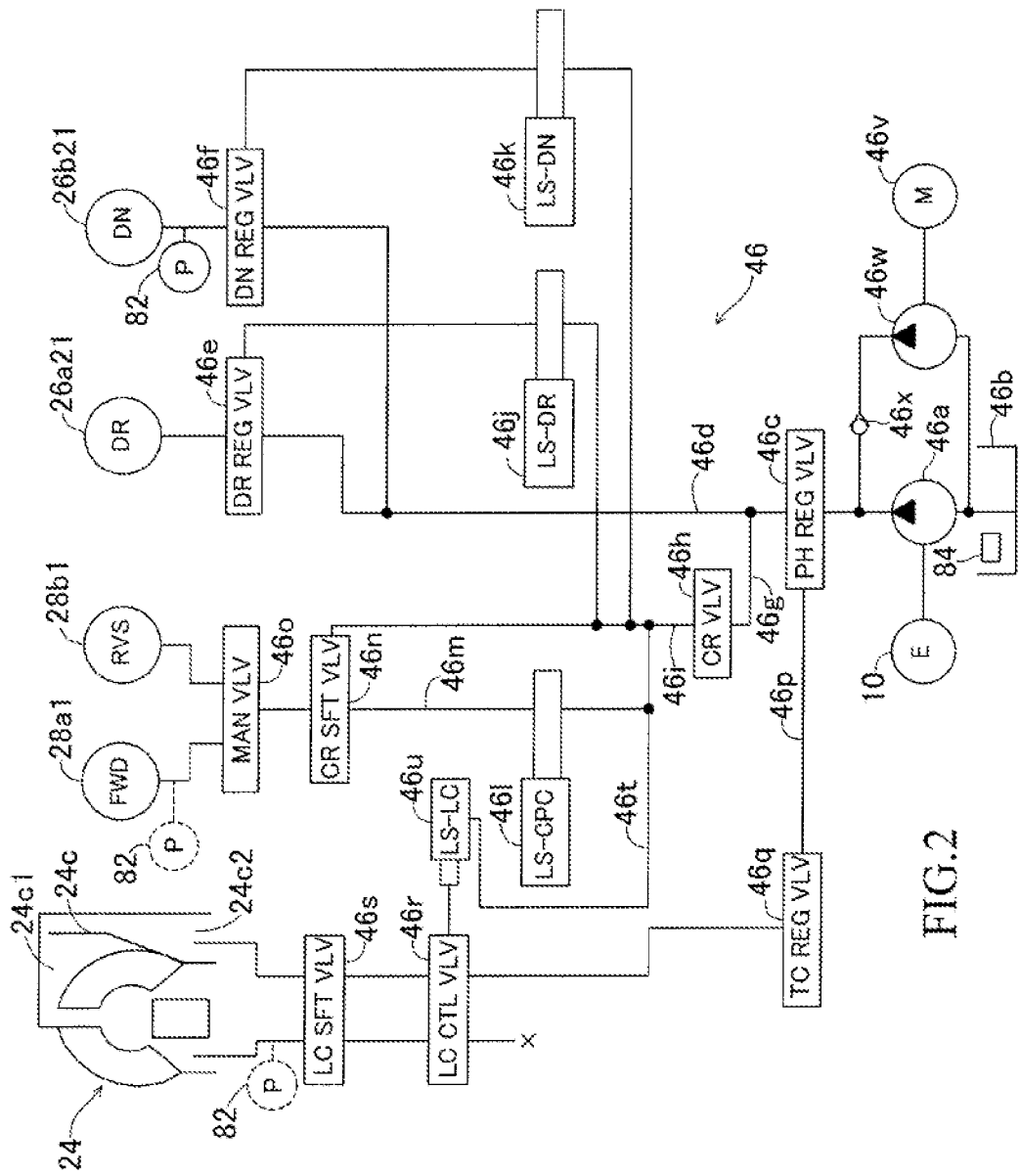
FIG. 2 is an oil pressure circuit diagram of an oil pressure supply mechanism.

FIG. 2 is an oil pressure circuit diagram of the oil pressure supply mechanism 46. As illustrated in FIG. 2, the oil pressure supply mechanism 46 includes a hydraulic pump 46a. The hydraulic pump 46a, which is made up of a gear pump, is driven by the engine 10 so as to pump operation oil stored in a reservoir 46b and supply the operation oil to a PH regulation valve 46c under pressure. An output (PH pressure (line pressure)) of the PH regulation valve 46c is connected, on one side, through an oil passage 46d to first and second regulator valves 46e and 46f and then respectively to a piston chamber (DR) 26a21 of the movable pulley half 26a2 of the drive pulley 26a and a piston chamber (DN) 26b21 of the movable pulley half 26b2 of the driven pulley 26b of the CVT 26. Also, the output of the PH regulation valve 46c is connected, on the other side, through an oil passage 46g to a CR valve 46h.

The CR valve 46h reduces the PH pressure to generate CR pressure (regulation pressure) and supplies the CR pressure through an oil passage 46i to first, second, and third (electromagnetic) linear solenoid valves 46, 46k, and 46l. The first and second linear solenoid valves 46j and 46k respectively apply output pressures determined in accordance with excitation of their solenoids to the first and second regulator valves 46e and 46f. Thus, the first and second linear solenoid valves 46j and 46k respectively supply the operation oil under the PH pressure supplied from the oil passage 46d to the piston chambers 26a21 and 26b21 of the movable pulley halves 26a2 and 26b2 so as to accordingly generate pulley side pressures.

Consequently, the pulley side pressures to move the movable pulley halves 26a2 and 26b2 in the axial direction are generated to change a pulley width of the drive pulley 26a and the driven pulley 26h so as to change a winding radius of the belt. 26c. In this manner, the side pressures of the pulleys are regulated to steplessly change a ratio (speed change ratio) at which the output of the engine 10 is transmitted to the drive wheels 12.

An output (CR pressure) of the CR valve 46h is also connected through an oil passage 46m to a CR shift valve 46n and then through a manual valve 46o to a piston chamber (FWD) 28a1 of the forward clutch 28a and a piston chamber (RVS) 28b1 of the reverse brake clutch 28b of the forward-reverse switcher 28.

As described above, the manual valve 46o connects the output of the CR shift valve 46n to one of the piston chambers 28a1 and 28b1 of the forward clutch 28a and the reverse brake clutch 28b in accordance with a position of the range selector 44 operated (selected) by the driver.

An output of the PH regulation valve 46c is supplied through an oil passage 46p to a TC regulator valve 46q. An output of the TC regulator valve 46q is connected through an LC control valve 46r to an LC shift valve 46s.

An output of the LC shift valve 46s is connected, on one side, to a piston chamber 24c1 of a lock-up clutch 24c of the torque convertor 24 and, on the other side, to a chamber 24c2 on the rear side of the lock-up clutch 24c.

While the operation oil is supplied to the piston chamber 24c1 through the LC shift valve 46s, the operation oil is discharged from the rear-side chamber 24c2. Then, the lock-up clutch 24c is engaged (ON), and the operation oil is supplied to the rear-side chamber 24c2. Meanwhile, when the operation oil is discharged from the piston chamber 24c 1, the lock-up clutch 24c is released (OFF). A slip amount of the lock-up clutch 24c is determined based on an amount of the operation oil supplied to the piston chamber 24c1 and the rear-side chamber 24c2.

An output of the CR valve 46h is connected through an oil passage 46t to the LC control valve 46r and the LC shift valve 46s. Also, a fourth linear solenoid valve 46u is inserted in the oil passage 46t. The slip amount of the lock-up clutch 24c is regulated (controlled) by excitation and non-excitation of the solenoid of the fourth linear solenoid valve 46u.

Moreover, to a position at the downstream of the hydraulic pump 46a, which is equivalent to the upstream of the PH regulation valve 46c, an EOP (electric oil-hydraulic pump) 46w connected to an electric motor 46v is connected through a check valve 46x.

The EOP 46w, which is similar to the hydraulic pump 46a, is made up of a gear pump and driven by the electric motor 46v so as to pump the operation oil stored in the reservoir 46b and supply the operation oil to the PH regulation valve 46c under pressure.

Referring back to FIG. 1, a crank angle sensor 50 is disposed at an appropriate position, for example, in the vicinity of a cam shaft (not illustrated) of the engine 10. The crank angle sensor 50 outputs a signal indicating an engine rotational speed NE at each predetermined crank angle position of the piston. An absolute pressure sensor 52 is disposed at an appropriate position at the downstream of the throttle valve in the intake system. The absolute pressure sensor 52 outputs a signal in proportion to an intake-pipe internal absolute pressure (engine load) PBA.

The actuator of the DBW mechanism 16 includes a throttle opening degree sensor 54. The throttle opening degree sensor 54 outputs a signal in proportion to an opening degree TH of the throttle valve based on a rotation rate of the actuator.

An accelerator opening degree sensor 56a is disposed in the vicinity of the accelerator pedal 56. The accelerator opening degree sensor 56a outputs a signal in proportion to an accelerator opening degree AP equivalent to an amount of the driver's operation of the accelerator pedal. A brake switch 36a is disposed in the vicinity of the brake pedal 36. The brake switch 36a outputs an ON signal in accordance with the driver's operation of the brake pedal 36.

A water temperature sensor 60 is disposed in the vicinity of a cooling water passage (not illustrated) of the engine 10. The water temperature sensor 60 generates an output in accordance with an engine cooling water temperature TW, namely, a temperature of the engine 10.

An idle stop cancel switch 58 operated by the driver is disposed on the driver's seat. This idle stop cancel switch 58 is a switch for disallowing (prohibiting) idle stop. Consequently, when the idle stop cancel switch 58 is on, idle stop is not performed and an idle state is continued even if an idle stop condition, described later, is satisfied.

Outputs of such components as the crank angle sensor 50 are sent to an engine controller (control means) 66. The engine controller 66 includes a microcomputer. Based on the sensor outputs, the engine controller 66 determines a target throttle opening degree so as to control operation of the DBW mechanism 16 and determines a fuel injection amount to drive the injector 20.

The main shaft MS includes an NT sensor (engine speed sensor) 70. The NT sensor 70 outputs a pulse signal indicating a rotational speed of a turbine runner 24b, specifically, a rotational speed NT of the main shaft MS (transmission input shaft rotational speed), more specifically, an input shaft rotational speed of the forward clutch 28a.

An NDR sensor (rotational speed sensor) 72 is disposed in the vicinity of the drive pulley 26a of the CVT 26. The NDR sensor 72 outputs a pulse signal in accordance with a rotational speed NDR of the drive pulley 26a, namely, an output shaft rotational speed of the forward clutch 28a.

An NDN sensor (rotational speed sensor) 74 is disposed in the vicinity of the driven pulley 26b. The NDN sensor 74 outputs a pulse signal indicating a rotational speed NDN of the driven pulley 26b, namely a rotational speed of the counter shaft CS (transmission output shaft rotational speed). A V sensor (rotational speed sensor) 76 is disposed in the vicinity of a gear 30b of the secondary shaft SS. The V sensor 76 outputs a pulse signal indicating a vehicle speed V based on the rotational speed of the secondary shaft SS.

A range selector switch 44a is disposed in the vicinity of the range selector 44. The range selector switch 44a outputs a signal in accordance with ranges R, N, and D, for example, selected by the driver.

As illustrated in FIG. 2, an oil pressure sensor 82 is disposed in an oil passage connected to the driven pulley 26b of the CVT 26 in the oil pressure supply mechanism 46. The oil pressure sensor 82 outputs a signal in accordance with an oil pressure supplied to the piston chamber 26b21 of the movable pulley half 26b2 of the driven pulley 26b. An oil temperature sensor 84 is disposed in the reservoir 46b. The oil temperature sensor 84 outputs a signal in accordance with an oil temperature (temperature TATF of the operation oil ATF). It is noted that, as indicated by imaginary lines in FIG. 3, the oil pressure sensor 82 may be disposed in an oil passage between the piston chamber 28a1 of the forward clutch 28a and the manual valve 46o or an oil passage connected to the lock-up clutch 24c of the torque convertor 24 so as to detect an oil pressure in a portion of these oil passages.

The outputs of sensors such as the NT sensor 70, which include outputs of other sensors not illustrated, are sent to the shift controller (control means) 90 illustrated in FIG. 1. The shift controller 90 also includes a microcomputer and is communicable with the engine controller 66. Based on the detection values detected by the sensors, the shift controller 90 excites or does not excite electromagnetic solenoids such as a linear solenoid valve of the brake fluid pressure supply mechanism 42 and the first and fourth ON/OFF solenoids 46u of the oil pressure supply mechanism 46 so as to control operations of the forward-reverse switcher 28, the CVT 26, and the torque convertor 24. Further, based on the detection values detected by the sensors, the shift controller 90 determines an amount of power supply to the electric motor 46v of the oil pressure supply mechanism 46 and supplies power to the electric motor 46v through a drive circuit (not illustrated) so as to drive the EOP 46w.

Next, a specific example of vehicle control processing according to this embodiment will be described. The engine controller 66 performs idle stop control of the engine 10 in addition to fuel injection control of the engine 10, for example. The idle stop control here is control of interrupting fuel supply to the engine 10 to automatically stop the engine 10 when a predetermined idle stop condition is satisfied. In the idle stop control, control is also performed to resume fuel supply to the engine 10 to restart the engine 10 by a starter (not illustrated) when the idle stop condition is no longer satisfied. The above-described idle stop condition is determined in advance based on factors such as the rotational speed of the engine 10, the vehicle speed, and the accelerator opening degree. As an example, the following is determined as the idle stop condition: the engine rotational speed NE obtained by the crank angle sensor 50 is close to an idle rotational speed (for example, 600 to 700 rpm), and the vehicle speed V obtained b the V sensor 76 is approximately zero, and it is detected that brake operation is performed by the brake switch 36a, and the accelerator opening degree obtained by the accelerator opening degree sensor 56a is approximately zero.

The shift controller 90 performs idle neutral control (also referred to as non-creep control, creep torque control, weak creep control) of controlling to make an engagement state of the forward clutch 28a neutral when at least a predetermined idle neutral condition is satisfied in an idle state of the engine 10. In this idle neutral control, an idle neutral state is implemented by controlling oil pressure supplied to the forward clutch 28a to make the forward clutch 28a half-engaged. In the example of this embodiment, the oil pressure supplied to the forward clutch 28a is decreased to make it slip so as to make transmission torque by the forward clutch 28a approximately zero. The idle neutral shift condition here is determined in advance based on factors such as the vehicle speed, the accelerator opening degree, and the shift lever position. As an example, the following is determined as the idle neutral shift condition: the vehicle speed V obtained by the V sensor 76 is approximately zero, and it is detected that brake operation is performed by the brake switch 36a, and the accelerator opening degree obtained by the accelerator opening degree sensor 56a is approximately zero, and the range selected by the range selector 44 is a position corresponding to a forward travel range (range D, for example). The shift controller 90 allows shift to an idle neutral state when the idle neutral shift condition is satisfied and disallows shift to the idle neutral state when the idle neutral shift condition is not satisfied.

Consequently, the engine controller 66 and the shift controller 90 of this embodiment are devices to function as the control means according to the present invention. The engine controller 66 has a function as idle stop performance determination means for making a determination as to whether to automatically stop the engine 10 in accordance with the predetermined idle stop condition. The engine controller 66 has a function as idle stop return determination means for making a determination as to whether to restart the engine 10 in accordance with a predetermined return condition from the idle stop state in which the engine 10 is automatically stopped by the idle stop performance determination means. The shift controller 90 has a function as idle neutral performance determination means for making a determination as to whether to perform the idle neutral control by controlling the forward clutch 28a to a released state in accordance with a predetermined idle neutral shift condition. As described later, in a case where the idle neutral control is performed after the engine 10 is returned from the idle stop state based on the determination by the idle stop return determination means, when it is determined that the rotational speed of the engine 10 is stabilized, the shift controller 90 performs determination as to performance of the idle neutral control.

Figure 3:
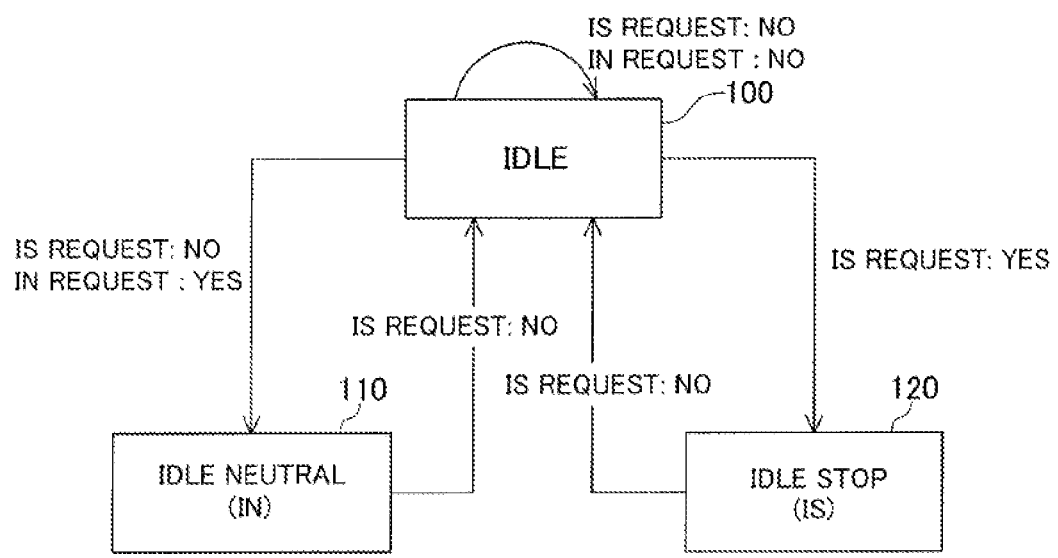
FIG. 3 is a diagram illustrating a relationship between idle neutral control and idle stop control.

FIG. 3 is a diagram illustrating a relationship of an idle state, an idle stop (IS) state, and an idle neutral (IN) state in the vehicle control in this embodiment. As illustrated in FIG. 3, when idle stop is not requested and when idle neutral is not requested, the engine 10 is in an idle state 100. In the idle state 100, when idle stop is requested, the engine 10 shifts to an idle stop (IS) state 120. In the idle stop state 120 of the engine 10, when idle stop is no longer requested, the engine 10 returns to the idle state 100. In the idle state 100, when idle stop is not requested and when idle neutral is requested, the engine 10 shifts to an idle neutral (IN) state 110. In the idle neutral state, when idle neutral is no longer requested, the engine 10 returns to the idle state 100. In this manner, when idle stop can be performed, idle stop is performed. When idle stop cannot be performed and when idle neutral can be performed, idle neutral is performed. It is noted that idle stop cannot be requested during idle neutral.

Figure 4:
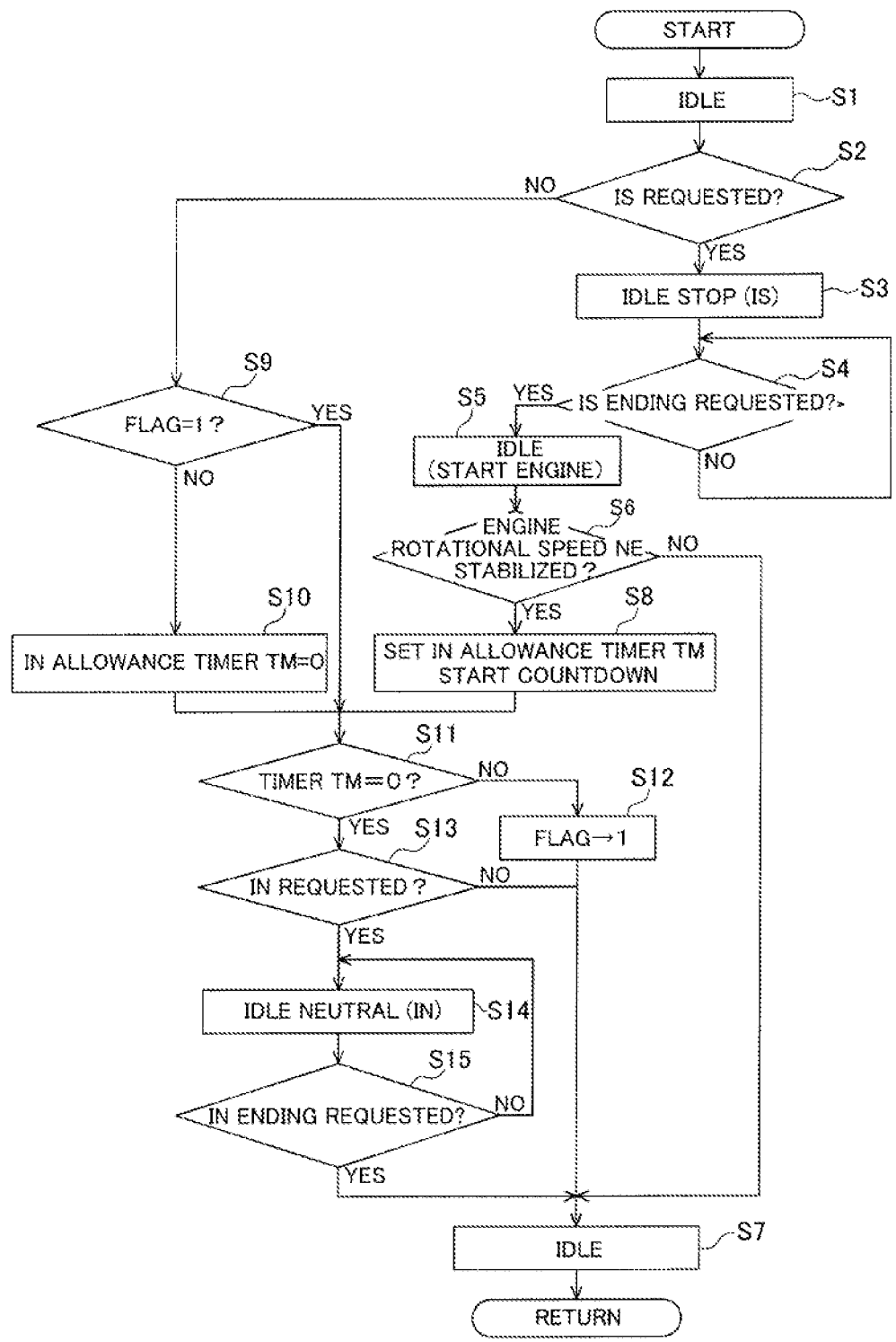
FIG. 4 is a flowchart of a control procedure of performing the idle neutral control after returning from an idle stop state.

FIG. 4 is a flowchart of procedure of controlling the vehicle according to this embodiment, specifically, control procedure of performing the idle neutral control after returning from the idle stop state. In this control, as illustrated in the flowchart of FIG. 4, in an idle state of the engine 10 (step S1), a determination is made as to whether idle stop (IS) is requested (step S2). An idle stop disallowance condition in this idle stop request is such a case as when it is determined that the brake pedal is not operated by the brake switch 36a (when brake pressure is lower than a predetermined pressure), when oil temperature of the operation oil in the oil pressure supply mechanism 46 detected by the oil temperature sensor 84 is higher than a predetermined temperature, and when an idle stop cancel switch 58 is on. As a result, when it is determined that idle stop is requested (YES), the engine 10 shifts to the idle stop (IS) state (step S3).

After that, a determination is made as to whether ending of idle stop is requested (step S4). When it is determined that ending of idle stop is requested (YES), the engine is started into the idle state (step S5). Subsequently, a determination is made as to whether the engine rotational speed NE obtained by the crank angle sensor 50 is stable (engine rotational speed stabilization determination) (step S6). This determination as to whether the engine rotational speed NE is stable is based on whether a change per unit time of the rotational speed of the engine 10 obtained by the crank angle sensor 50 is less than a predetermined value.

As a result, when it is determined that the engine rotational speed is not stable (NO), the idle state is continued as it is (step S7). When it is determined that the engine rotational speed is stable (YES), an idle neutral allowance timer (predetermined delay time) TM is set, and countdown of the timer TM is started (step S8). In the preceding step S2, when it is determined that idle stop is not requested (NO), a determination is made as to whether flag F=1 for determining ending of the countdown of the idle neutral allowance timer TM (step S9). Unless flag F=1 (NO), the idle neutral allowance timer TM=0 (step S10). When flag F=1 (YES) or when the idle neutral allowance timer TM is set to start countdown at step S8 or when it is set at step S10 that the idle neutral allowance timer TM=0 to start countdown a determination is made as to whether the idle neutral allowance timer TM=0 (step S11). As a result, unless the idle neutral allowance timer TM=0 (NO), flag→1 (step S12), and the idle state is continued (step S7). When the idle neutral allowance timer TM=0 (YES), a determination is made as to whether idle neutral (IN) is requested (step S13). An idle neutral disallowance condition in this idle neutral request is, for example, pressing of the brake pedal is released to make the brake switch 36a is off. As a result, when it is determined that idle neutral is not requested (NO), the idle state is continued (step S7). When it is determined that idle neutral is requested (YES), the engine 10 shifts to an idle neutral state (step S14).

After that, a determination is made as to whether ending of idle neutral (IN) is requested (step S15). When ending of idle neutral is not requested (NO), idle neutral is continued. When ending of idle neutral is requested (YES), the idle neutral state is ended to shift to the idle state (step S7).

Figure 5:
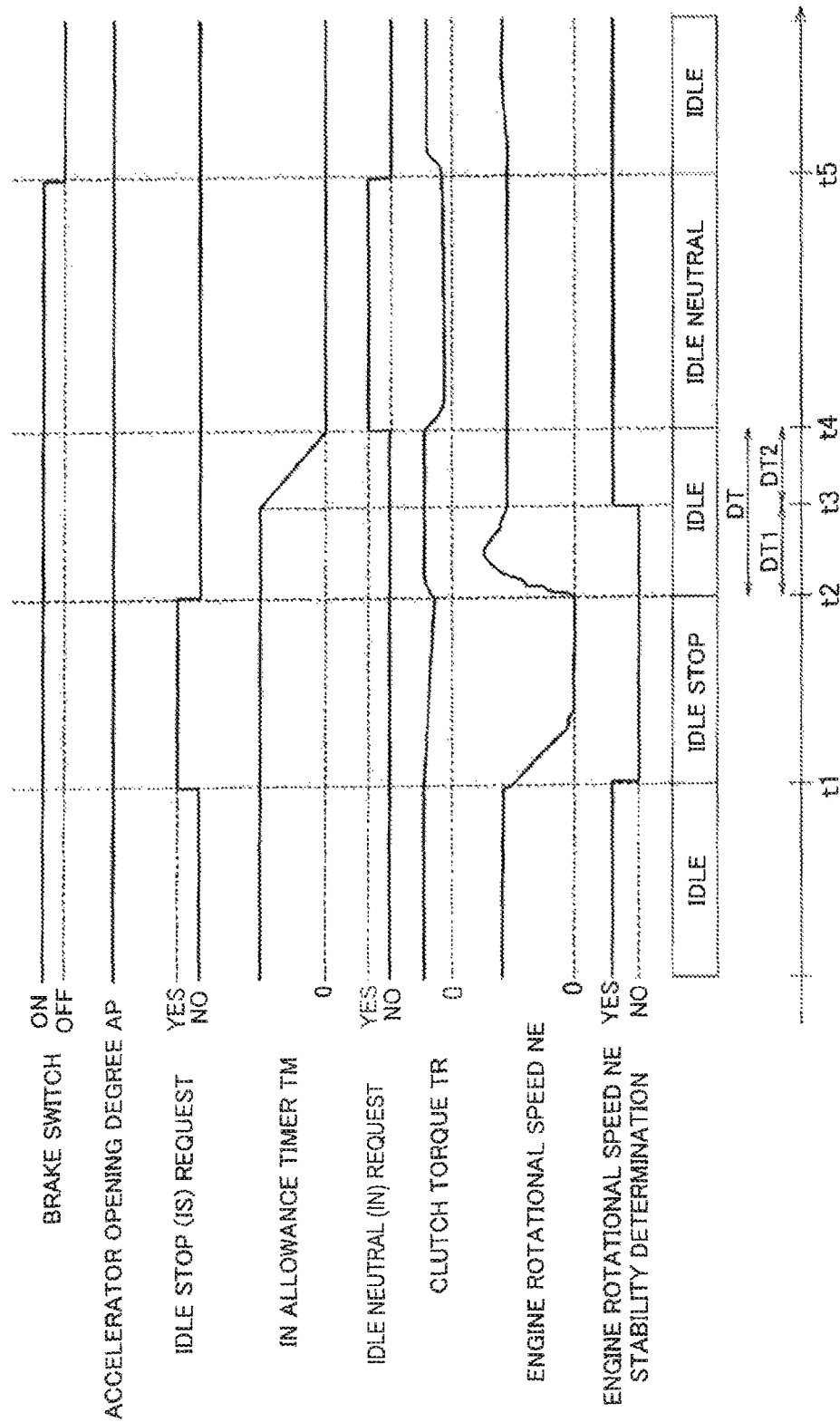
FIG. 5 is a timing chart illustrating changes in various values in the control in which the idle neutral control is performed after returning from the idle stop state.

FIG. 5 is a timing chart of changes in various values in control of performing the idle neutral control after returning from the idle stop state. The timing chart of FIG. 5 illustrates changes in the following in this order from the top with respect to their elapsed time: ON-OFF of the brake switch 36*a*, the accelerator opening degree AP, YES or NO of idle stop (IS) request, the idle neutral (IN) allowance timer TM, YES or NO of idle neutral (IN) request, a clutch torque TR of the forward clutch 28*a*, the engine rotational speed NE, and YES or NO of stability determination of the engine rotational speed NE.

As illustrated in FIG. 5, in an idle state of the engine 10, at timing t1, an idle stop request is issued, and the engine 10 shifts from the idle state to an idle stop state. Thus, the engine rotational speed NE starts to decrease. At the same time, stability determination of the engine rotational speed NE is cancelled. Then, when at timing t2 the idle stop request is cancelled, the engine 10 is started, and the engine rotational speed NE starts to increase. Then, when at timing t3 a determination is made as to stability of the engine rotational speed NE, countdown of the idle neutral allowance timer TM is started. When at timing t4 the idle neutral allowance timer TM=0 (count-up), an idle neutral request is issued, and the engine 10 shifts to the idle neutral state. In the idle neutral state, the clutch torque TR of the forward clutch 28*a* is decreased. Then, at timing t5, the brake switch 36*a* is turned off to cancel the idle neutral request. Thus, the forward clutch 28*a* is engaged (completely engaged) to implement the idle state.

Here, as illustrated in the timing chart of FIG. 5, when the idle neutral control is performed after returning from the idle stop state (between timing t1 and timing t2), control does not shift to the idle neutral control (does not make a determination as to performing the idle neutral control) immediately after returning from the idle stop state. When it is determined that the rotational speed of the engine 10 is stabilized (timing t4), control shifts to the idle neutral control. Moreover, in this case, after it is determined that a change in the rotational speed of the engine 10 per unit time is less than the predetermined value (timing t3), and when the timer TM to measure predetermined delay time (DT2) proceeds (timing t4), it is determined that the rotational speed of the engine 10 is stabilized, and performance determination of the idle neutral control is made. That is, delay time (DT) from returning from the idle stop state till shifting to the idle neutral control is a sum (DT=DT1+DT2) of time DT1 (=t3-t4) and DT2 (=t4-t3). Time DT1 is from timing t2 when the idle stop request is cancelled to timing t3 when stability of the engine rotational speed NE is determined. Time DT2 is from timing t3 when countdown of the idle neutral allowance timer TM is started to timing t4 when the idle neutral allowance timer TM=0.

As has been described heretofore, with the vehicle control device according to this embodiment, in control in which the idle stop control and the idle neutral control coexist, the idle neutral control is performed when the idle stop control cannot be performed so as to sufficiently improve fuel efficiency (fuel consumption rate) of the vehicle. In this case, when returning from the idle stop state, the idle neutral control is not performed immediately after the return but the idle neutral control is performed when it is determined that the rotational speed of the engine 10 is stabilized. That is, when the idle neutral control can be performed after returning from the idle stop state, the engine 10 shifts from the idle stop state to the idle state once, and in this state, a determination is made as to whether the rotational speed of the engine 10 is stabilized. When it is determined that the rotational speed of the engine 10 is stabilized, the idle neutral control is performed. Thus, when the idle neutral control is performed after returning from the idle stop state, it is possible to effectively prevent sudden increase of the rotational speed (engine pick-up) and hunting (irregularity of the rotational speed) of the engine 10, and occurrence of an engine stall caused by abrupt connection to the forward clutch 28*a* that follows.

In order to make performance determination of the idle neutral control in the control of this embodiment, after it is determined that the change in the rotational speed of the engine 10 per unit time is less than the predetermined value, and when the predetermined delay time (DT2) by the idle neutral allowance timer TM elapses, it is determined that the rotational speed of the engine 10 is stabilized. Thus, performance determination of the idle neutral control is made. In this manner, when the idle neutral control is performed after returning from the idle stop state, elapse of the predetermined delay time is regarded as a condition in addition to determination as to stabilization of the engine rotational speed. Consequently, after the rotational speed of the engine 10 is fully stabilized, it is possible to shift to the idle neutral control. Therefore, when shifting to the idle neutral control, it is possible to more effectively prevent sudden increase of the engine rotational speed (engine pick-up) and occurrence of an engine stall.

Although the embodiment of the present invention has been described so far, the present invention should not be limited to this embodiment. Various modifications are possible within the scope of the claims and the subject matter described in the specification and the drawings. For example, the specific configuration of the vehicle described in the above-described embodiment is an example. The vehicle according to the present invention may have a configuration other than the above-described one. For example, in this embodiment, the transmission including the automatic transmission 26 made up of the CVT is described as the transmission of the vehicle according to the present invention. The transmission according to the present invention, however, should not be limited to the transmission described in the above-described embodiment but may be a transmission of another configuration such as a stepwise automatic transmission.

In the above-described embodiment, the vehicle only including the engine 10 as a drive source of the vehicle is described. The vehicle according to the present invention, however, may be other vehicles such as a hybrid vehicle including not only an engine (internal combustion engine) but also an electric motor (motor) as a drive source of the vehicle. In this case, the hybrid vehicle includes a battery (storage cell) to supply and receive power to and from the electric motor. In this case, it is possible to add, as an idle stop disallowance condition for disallowing the idle stop of the vehicle, a case in which the voltage of this battery is lower than a predetermined voltage (the remaining capacity of the battery is lower than a predetermined capacity).

The invention claimed is:
1. A control device for a vehicle comprising:
an engine as a drive source of the vehicle;
a transmission configured to change a speed of rotation by drive force of the engine and output the rotation;
a connector/disconnector configured to connect/disconnect transmission of the drive force from the engine to the transmission; and
control means for controlling the engine, the transmission, and the connector/disconnector and comprising:

idle stop performance determination means for making a determination as to whether to automatically stop the engine in accordance with a predetermined idle stop condition;

idle stop return determination means for making a determination as to whether to restart the engine in accordance with a predetermined return condition from an idle stop state in which the engine is automatically stopped by the idle stop performance determination means; and idle neutral performance determination means for making a determination as to whether to perform idle neutral control by shifting the connector/disconnector to a released state in accordance with a predetermined idle neutral shift condition, wherein, in a case where the idle stop state is ended based on the determination by the idle stop return determination means and the engine is restarted, the idle neutral performance determination means makes a determination as to performance of the idle neutral control, after it is determined that a rotational speed of the engine is stabilized.

2. The control device for the vehicle according to claim 1, wherein control device further comprises engine rotational speed change determination means for making a determination as to whether a change in the rotational speed of the engine per unit time is less than a predetermined value, and delay time measurement means for measuring predetermined delay time, wherein the rotational speed of the engine is determined to have stabilized when the engine rotational speed change determination means determines that the change in the rotational speed of the engine per unit time is less than the predetermined value, and wherein the idle neutral performance determination means makes a determination as to performance of the idle neutral control after a predetermined delay time, measured by the delay time measurement means, has elapsed from when the rotational speed of the engine stabilized.

3. A control device for a vehicle comprising:

an engine as a drive source of the vehicle;

a transmission configured to change a speed of rotation by drive force of the engine and output the rotation;

a connector/disconnector configured to connect/disconnect transmission of the drive force from the engine to the transmission; and controller which controls engine, the transmission, and the connector/disconnector, wherein the controller is configured to make a determination as to whether to automatically stop the engine in accordance with a predetermined idle stop condition, wherein the controller is configured to make a determination as to whether to restart the engine in accordance with a predetermined return condition from an idle stop state in which the engine is automatically stopped, wherein the controller is configured to make a determination as to whether to perform idle neutral control by shifting the connector/disconnector to a released state in accordance with a predetermined idle neutral shift condition, wherein, in a case where the idle stop state is ended the engine is restarted, the controller makes a determination as to performance of the idle neutral control when it is determined that a rotational speed of the engine is stabilized.

4. The control device for the vehicle according to claim 3, wherein control device further comprises engine rotational speed sensor, and a timer, wherein the rotational speed of the engine is determined to have stabilized when the change in the rotational speed of the engine per unit time is less than the predetermined value, and wherein controller makes a determination as to performance of the idle neutral control after a predetermined delay time, measured by the timer, has elapsed from when the rotational speed of the engine stabilized.

\* \* \* \* \*